3,442,663
METHOD OF TREATING A SAUSAGE CASING
WITH A RELEASE COATING AND PRODUCT
RESULTING THEREFROM
Albin F. Turbak, Danville, Ill., assignor to Tee-Pak, Inc.,
Chicago, Ill., a corporation of Illinois
No Drawing. Filed Jan. 24, 1966, Ser. No. 522,375
Int. Cl. A22c 13/00
U.S. Cl. 99—176                                              5 Claims

ABSTRACT OF THE DISCLOSURE

A process for treating artificial sausage casings to improve peelability of the casing from a sausage processed therein consists of applying to the inner surface of the sausage casing a coating of 0.0001–1.0% of a polymerized methyl hydrogen siloxane in the form of a solution consisting of the siloxane dissolved in a vegetable oil to provide a tightly adherent coating bonded to the casing.

---

This invention relates to new and useful improvements in artificial sausage casings and more particularly to cellulosic sausage casings provided with a new and improved release coating.

In the preparation of sausages of various types, ranging from smaller sausages such as frankfurters and Viennas up to large sausages such as bolognas, the sausage meat is normally extruded into a tubular casing for processing. In the early days of the meat packing industry sausages were prepared using natural casings. About 40 years ago casings were developed of regenerated cellulose which had been used in the preparation of sausages of all sizes. There were also developed special sausage casings of regenerated cellulose which were reinforced with paper to provide for dimensional stability in the production of sausages where a fixed size was important. In the manufacture of sausages, both small sausages of the frankfurter type and large sausages of the bologna type, a major problem has been the stripping of the sausage casing from the sausage after it has been smoked and cooked by the meat packer. This problem has been especially great in the case of frankfurter sausages because of the large number of sausages processed.

It is, therefore, one object of this invention to provide a new and improved sausage casing having a novel release coating permitting easy removal of the casing from smoked and cooked sausages.

A feature of this invention is the provision of a new and improved sausage casing having an interior coating of a polymerized silicone oil which is easily released from sausages processed in the casing.

Other objects and features of this invention will become apparent from time to time throughout the specification and claims as hereinafter related.

SUMMARY OF THE INVENTION

This invention is based upon the discovery that artificial sausage casings, particularly casings of regenerated cellulose, both of the clear cellulose and fibrous reinforced types, may be provided with an internal coating of a silicone polymer to provide for easy release of the casing from sausages which are processed in the casing. The silicone oil which is used to treat the casing to provide an internal coating is preferably a polymer of a methyl hydrogen silicone which is applied to the inner surface of the casing in the form of a solution in a vegetable oil containing a small amount of a food grade anti-oxidant and a catalyst, preferably an organo-tin catalyst such as dibutyl tin dilaurate or dibutyl tin diacetate. When this solution is applied to the inner surface of the casing it is polymerized upon storage over an extended period of time and is anchored to the cellulose so that the coating is not easily extracted from the film. The catalyzed polymerization of the silicone coating may be accelerated by stirring the coated casing at an elevated temperature, e.g., 90° C. for several hours or by exposure to a dielectric or microwave heater for about 1 to 5 min.

The solution of silicone can be applied to the inner surface of the casing in the form of a slug of liquid introduced into the casing during its manufacture so that the casing moves past the liquid slug and coats the inner surface. The coating can also be applied by soaking the casing in a sufficient amount of the solution to soak through to the inner surface. This technique, however, is quite wasteful of the silicone and is not preferred. The preferred method of applying the silicone solution (or the silicone alone) is by introduction into the interior of the casing through the mandrel of a shirring machine. Cellulose casings are normally shirred on an apparatus as described in U.S. Patents 2,010,626, 2,583,654, 2,722,714, 2,722,715, or 2,723,201. The shirring machine has a hollow mandrel through which compressed air is introduced for inflating the casing during shirring. A coating material such as a silicone or solution of silicone may be introduced through the hollow mandrel of the shirring machine to coat the interior surface of the casing shirred thereon.

In the manufacture of regenerated cellulose sausage casings viscose is extruded through an annular die into a coagulating and regenerating bath to produce a tube of regenerated cellulose. The tube is subsequently washed, plasticized with glycerine, and dried while inflated under a substantial air pressure for size control. After drying, the casing is wound on reels and subsequently shirred as previously described. Reinforced cellulose casing, also known as fibrous casing, is prepared by forming a tube of a long fiber hemp paper, impregnating the paper tube with viscose, and regenerating cellulose in and on the paper tube. The viscose impregnated tube is passed into a coagulating and regenerating bath and the tube subsequently washed, plasticized with glycerine, and dried under air pressure. Fibrous casing is used largely for the production of large sausages such as bolognas. Fibrous casing is normally sold as flat stock either in the form of reelstock or cut into pieces of predetermined length.

It has been found that cellulose casings, both of the unreinforced and the fibrous reinforced types, is more easily released from the surface of sausages processed in the casing when provided with an internal coating of a polymerized methyl hydrogen siloxane, also called a methyl hydrogen silicone. The silicone is applied to the inner wall surface of the casing in an amount ranging from 0.0001 to 1.0% of the wt. of the casing either as an undiluted silicone or diluted in the form of a vegetable oil solution. In either case the silicone is applied in admixture with a catalyst such as dibutyl tin dilaurate or dibutyl tin diacetate. When the silicone is added in solution in a vegetable oil it is necessary to include a small amount of a food grade anti-oxidant for the oil, such as, butylated hydroxyanisole or butylated hydroxy toluene.

The following nonlimiting examples are illustrative of the scope of this invention:

EXAMPLE 1

A clear regenerated cellulose casing was shirred on a commercial shirring machine while introducing a uniform internal coating of a polymerized methyl hydrogen siloxane. The silicone was added in the form of a 2% solution in Wesson oil (a common cooking oil) in the amount of 0.5% of the solution based on the weight of the casing. Solution was introduced through the mandrel of the shirring machine and applied as a uniform coating on the inside of the casing. The solution of polymerized methyl hydrogen siloxane was added with approximately 0.1% (based on the silicone) of dibutyl tin dilaurate catalyst. Casing was also shirred while applying an internal coating of undiluted polymerized methyl hydrogen siloxane in admixture with 1 part dibutyl tin dilaurate per 800 parts of silicone. The silicone-catalyst mixture was applied as an internal coating in the amount of 0.5% of the weight of the casing. At the same time a like amount of silicone-catalyst mixture was applied as a coating on the outside of the casing during shirring.

The shirred casings having an internal coating of polymerized methyl siloxane are either stored at ambient temperature or elevated temperature for a time sufficient to effect substantially complete polymerization of the silicone or are subjected to dielectric or microwave heating for a time sufficient to polymerize silicone to produce a coherent and strongly adherent coating which is not easily extracted from the casing. The casings which were coated as described above were stuffed with frankfurter emulsions and linked, smoked, and cooked. These casings were compared with untreated controls and with controls having only an internal coating of vegetable oil. In each case, there was a reduction of 20 to 100% in peeling misses when the cooked and smoked frankfurters were passed through a commercial casing peeler.

EXAMPLE 2

A fibrous cellulose casing is prepared as described in various prior patents, such as, Firth, U.S. Patent 3,106,471. A solution consisting of 2% polymerized methyl siloxane in Wesson oil, containing dibutyl tin diacetate and butylated hydroxy anisole, is placed as a slug of liquid inside a portion of fibrous casing. As the fibrous casing is moved past the liquid slug the inner surface of the casing is coated with about 0.5% of the solution. The casing is dried while inflated under air pressure and subsequently used in the production of bologna sausages. The casing having an internal coating of polymerized methyl hydrogen siloxane is stored at room temperature or at elevated temperatures for a time sufficient to substantially completely polymerize the silicone or is subjected to dielectric or microwave heating to effect polymerization. The polymerized coating is not easily extracted from the casing. When this silicone coated casing is used in the production of bologna sausages there is a substantial reduction in the force required to strip the casing from the surface of a finished sausage, as compared to untreated controls.

While this invention has been described fully and completely with special emphasis upon a preferred embodiment, it should be understood that within the scope of the appended claims, the invention may be practiced otherwise than as specifically described herein.

What is claimed is:

1. A process for treating an artificial sausage casing to improve the peelability of the casing from a sausage processed therein consisting of applying to the inner surface of said casing a coating of 0.0001–1.0% of a polymerized methyl hydrogen siloxane, based on the weight of the casing, in the form of a solution consisting of the siloxane dissolved in a vegetable oil.

2. A process in accordance with claim 1 in which the casing is of regenerated cellulose or regenerated cellulose reinforced with a fibrous material.

3. A process in accordance with claim 2 in which the coating contains a small amount of a non-toxic organo-tin catalyst.

4. A process in accordance with claim 2 in which the coating contains a food grade anti-oxidant.

5. An artificial sausage casing having its inner surface coated with 0.0001–1.0% of a polymerized methyl hydrogen siloxane by the process of claim 1.

References Cited

UNITED STATES PATENTS

| 2,933,399 | 4/1960 | Nickerson et al. | 99—157 X |
| 2,985,545 | 5/1961 | Leavitt. | |
| 3,307,956 | 3/1967 | Chiu et al. | 99—176 |

OTHER REFERENCES

"Merck Index," 7th edition, 1960, published by Merck and Co., Inc., Rahway, N.J., p. 934, article entitled Silicones.

HYMAN LORD, *Primary Examiner.*

U.S. Cl. X.R.

99—109, 175